United States Patent [19]

Thiel et al.

[11] Patent Number: 4,621,793

[45] Date of Patent: Nov. 11, 1986

[54] SUPERHEATED MATERIAL COOLING CAR WITH HEAT DEFLECTORS THAT RESTRICT SIDEWAYS RADIATION

[76] Inventors: Robert Thiel; Edward Bielawski, both of P.O. Box 2163, Niagara Falls, Ontario, Canada, L2E 6Z3

[21] Appl. No.: 417,263

[22] Filed: Sep. 13, 1982

[51] Int. Cl.⁴ .................. B61D 3/16; B61D 5/00; B61D 17/18; C21B 3/10

[52] U.S. Cl. .................. 266/165; 266/286; 266/275; 141/233; 141/326; 126/343.5 R; 432/77; 220/335; 105/238 R

[58] Field of Search .................. 105/238 R, 254, 255, 105/256, 257, 261 R, 264, 265, 266, 267, 270, 271, 272, 273, 274, 275, 377, 406 R, 355; 266/143, 165, 286, 275, 165; 126/343.5 R; 141/233, 326; 220/335; 432/77

[56] References Cited

U.S. PATENT DOCUMENTS

| | | | |
|---|---|---|---|
| 266,480 | 10/1882 | Kennedy | 266/165 X |
| 953,176 | 3/1910 | Neikirk | 105/406 R |
| 1,517,820 | 12/1924 | Bong | 266/286 |
| 1,645,587 | 10/1927 | Chatmers | 105/254 |
| 1,785,292 | 12/1930 | Astrom | 105/270 X |
| 3,386,435 | 6/1968 | Heller | 126/343.5 R |
| 3,861,737 | 1/1975 | Kirkbride | 105/377 X |
| 4,077,328 | 3/1978 | Taylor | 105/261 A |

Primary Examiner—Robert B. Reeves
Assistant Examiner—Scott H. Werny
Attorney, Agent, or Firm—Rogers, Bereskin & Parr

[57] ABSTRACT

The invention provides a casting car for use in removing super-heated molten materials from an electric arc melting furnace. The cooling car has a metal frame which includes a shallow container adapted to receive the molten materials. A relatively permanent refractory lining protects the interior surface of the container, and a replenishable, granular refractory material is deposited over the permanent refractory lining. Heat deflectors extend upwardly from the metal frame about the top of the container in order to channel heat radiated from the interior upwardly whereby melting plant equipment and personnel located near the cooling car are not subjected to very intense radiant heat. Wheels are secured to the bottom of the metal frame to permit the cooling car to be rolled along the track leading to the melting furnace to receive the super-heated molten materials.

10 Claims, 2 Drawing Figures

SUPERHEATED MATERIAL COOLING CAR WITH HEAT DEFLECTORS THAT RESTRICT SIDEWAYS RADIATION

FIELD OF THE INVENTION

The invention relates to removal of super-heated molten materials from a melting furnace or the like, and in particular relates to a cooling car which can be used to safely transfer such materials to a covenient location where they can be allowed to cool.

BACKGROUND OF THE INVENTION

The invention has a particular application to the production of aluminum oxide in an electric arc furnace. In such a process, abrasive grade bauxite is mixed with a coke reductant and iron in the form of chips, cast iron bits, or iron pellets, and then subjected to the intense heat of electrical discharges between massive electrodes. Aluminum oxide is poured periodically from the furnace into a refractory-lined steel vessel and allowed to cool. During the melting process, ferrosilicon materials are precipitated, and because of their density are trapped beneath a liquid aluminum oxide layer produced in the process. Relatively clean aluminum oxide will be poured at predetermined intervals, until at some point, because of the accumulation of ferrosilicon materials at the bottom of the furnace, it becomes difficult to pour the aluminum oxide without visible contamination by the precipitated materials. The precipitated materials must then be poured from the furnace. Pouring of the precipitated materials is a particularly dangerous process, because the materials are heated to a temperature in excess of about 2100° C. which is well above their melting point, and the materials are consequently very fluid and intensely hot.

According to present practice, the precipitated materials are poured into deep, refractory-lined steel shells, such as the shells used to contain the aluminum oxide when poured. Because of the insulating property of the refractory linings, a cooling period in the order of 2–3 days is not uncommon before the materials are sufficiently solidified to permit removal. Such an extended cooling time increases the risk of burn-through of the refractory lining, and the attendant risk of spillage. The consequences of spillage are so severe that it is not uncommon for the cooling vessel to be allowed to stand for a period of several hours to permit a thin film to form over the surface of the super-heated materials thereby reducing the possibility of minor spillage with movement of the cooling vessel to a more convenient cooling location.

Another removal process involves pouring the super-heated materials into a spillway leading to a fixed bin or pit. The spillway is generally lined with refractory brick, and the pit or fixed bin lined with a similar refractory material which is then covered with layers of a granular refractory such as ordinary silica sand. The process has the advantage that the intensely heated materials are very quickly removed from the melting area to a safe location; however, the process requires periodic maintenance to the refractory lining of the spillway, and the subsequent disposal of cooled materials can be relatively inconvenient.

The development of a better method of disposing of these super-heated materials has been hindered because of the relative reluctance to experiment in this area. The danger of spillage and the intense heat of the materials represent a very substantial risk to plant and personnel which militates against experimentation. However, the inventors have developed and tested a novel cooling car for removing such super-heated materials from a melting furnace, which car permits a considerable reduction in cooling time, and also permits convenient disposal of solidified materials.

BRIEF SUMMARY OF THE INVENTION

The invention provides a cooling or casting car for use in removing super-heated molten materials from a melting furnace or the like. The cooling car has a metal frame including a shallow container with an open top for receiving the molten materials. A relatively permanent refractory lining protects the interior surface of the container. Heat deflector means are secured about the top of the container to channel heat radiated from molten materials upwardly. Wheels are secured to the metal frame to permit the cooling car to be rolled, for example, on a conventional railway-type track extending between the melting furnace and a convenient cooling area. In practice, the relatively permanent refractory lining is covered with a granular refractory material which can be replenished between pourings of the super-heated materials into the cooling car.

The cooling car is relatively shallow to permit more rapid cooling of contained materials. The term "shallow" as used in respect of the cooling car container should be understood as implying that the opening in the container has a surface area at least 10 times the average depth of the container when lined with refractory materials.

BRIEF DESCRIPTION OF THE DRAWINGS

The advantages and objects of the invention will be better understood with reference to drawings in which.

DETAILED DESCRIPTION OF A PREFERRED EMBODIMENT

Figures 1, 2:
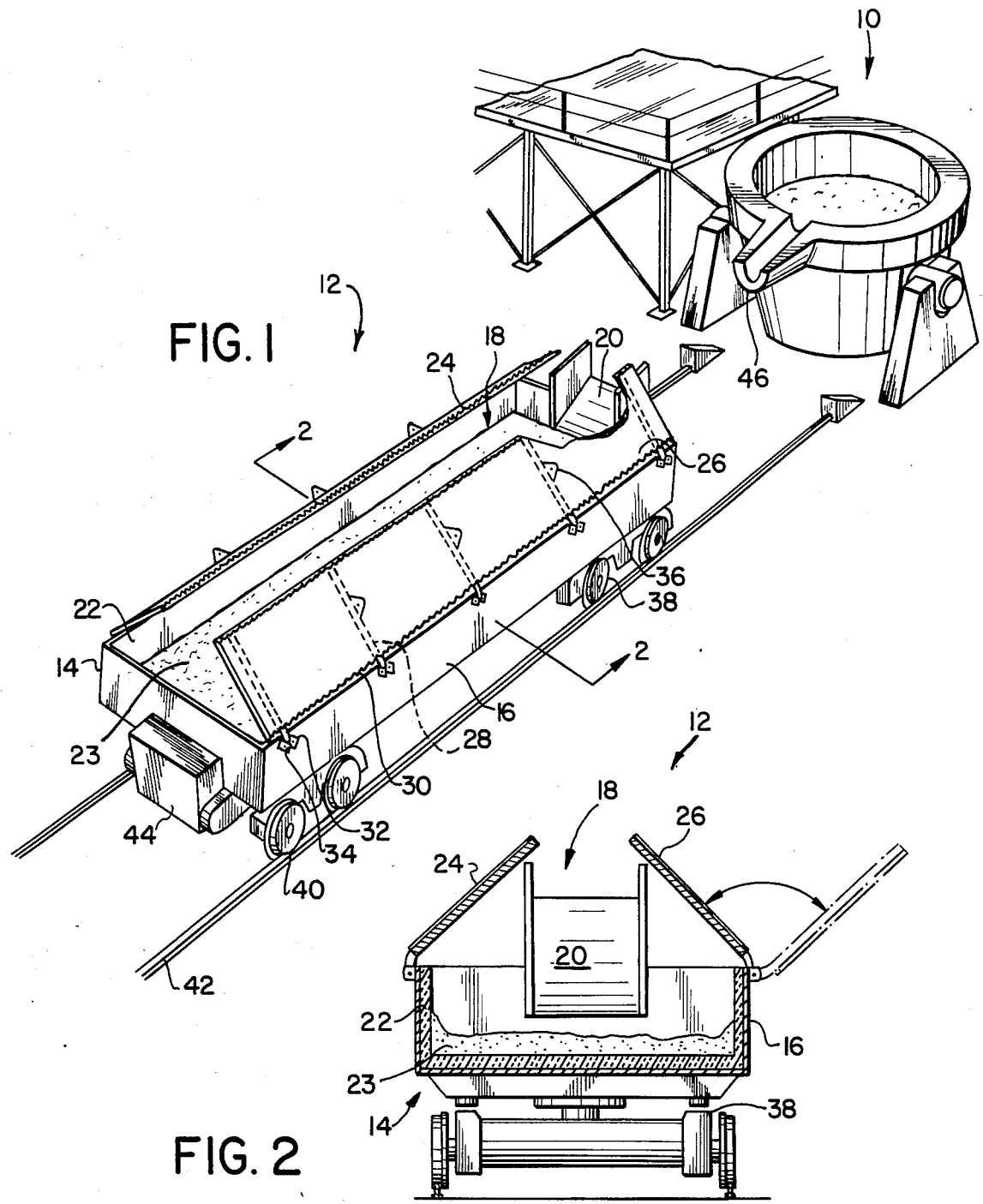
FIG. 1 is a partially fragmented perspective view illustrating a preferred embodiment of a cooling car located on a track leading to a melting furnace; and, FIG. 2 is a cross-sectional view through the cooling car taken along the lines 2—2 of FIG. 1.

FIG. 1 illustrates portions of a melting plant which produces aluminum oxide crude from abrasive grade bauxite ore. The plant includes a conventional electric arc furnace 10 (considerable detail of which has not been illustrated). Electrodes are normally lowered into the electric furnace 10 to produce the very intense arc necessary to melt abrasive grade bauxite. During the process, a super-heated ferrosilicon material at a temperature in excess of about 2100° C. deposits at the bottom of the furnace 10.

FIG. 1 also illustrates a cooling car 12 which is a preferred embodiment of the invention. The cooling car 12 has a steel frame 14 which includes a generally rectangular container 16 having an open top 18. The container 16 is constructed with an inclined guide chute 20 that serves in use to direct the flow of molten materials into the cooling car 12 between a pair of generally parallel, spaced apart sidewalls. The interior surface of the container 16 is lined with a relatively permanent refractory lining 22 which is a refractory cement containing aluminum silicate. This refractory lining 22 is formed over lengths of angle iron (not illustrated) which are welded to the interior surface of the container 16, and secure the lining 22 to the container 16. Any suitable refractory lining of a relatively permanent nature can be provided (such as refractory brick), but a conventional refractory cement is strongly preferred for ease of installation. A self-baking material can be used, or the lining 22 may be burned-in, if necessary, with a pour of any suitable heated setting material provided by a furnace. Such refractory materials are well known to those skilled in the art, and their appropriate treatment will be readily understood.

The container 16 is relatively shallow when lined. The length of the container is about 30 feet, the width about 15 feet, and the depth about 2 feet. The relatively permanent refractory lining 22 is formed to a thickness of about 6 inches. In use, a granular refractory 23 which is preferably an ordinary silica sand is deposited over the permanent refractory lining 22, to a depth of about 12 inches. As apparent in the cross-sectional view of FIG. 2, the granular refractory 23 is spread up the walls of the refractory lining 22 to an extent permitted by the natural angle of repose of the granular refractory 23. As a result, the container 16 in use has an average depth of about 6 inches. In this manner, a cooling time which might typically be 2-3 days in a conventional refractory-lined shell can be reduced to about 24 hours.

In initial experiments with the cooling car, heat escaping from super-heated ferrosilicon materials poured into the car severely damaged adjoining property. It was found that the heat radiated could be channeled upwardly by locating two substantially identical elongate heat deflectors 24, 26 along the longitudinal extent, of the open top 18, one on either side of the open top 18. The heat deflector 26 comprises a tubular steel frame 28 which extends upwardly at an angle of about 45° to vertical over the periphery of the open top 18. Corrugated steel sheets 30 are secured to the tubular frame 28, and serve as heat shields. A cloth-like refractory material can be used on surfaces of the frame 28 exposed to the contained molten materials, but in testing these have tended to be torn periodically. A more substantial refractory lining can be applied to the interior surfaces of the frame 28, but the corrugated sheets 30 have proven satisfactory, although they do have a tendency to buckle and may have to be replaced periodically. Downwardly extending legs 32 (only one specifically indicated) of the frame 28 are pivotally secured to support structure 34 extending from the side of the frame 14. This arrangement permits the deflector 26 to be pivoted to a retracted position away from the open top 18 of the container 16 to facilitate removal of solidified materials, and a number of apertured lugs 36 (only one specifically indicated) are secured to the frame 28 for use in pivoting the heat deflector 26. It will be appreciated that each of heat deflectors 24, 26 can be constructed as a plurality of separate heat deflecting members, which can be separately moveable.

Wheel assemblies 38, 40 are the same as those of conventional railway cars and are secured to the bottom of the frame 14. These ride on a substantially horizontal track 42 embedded in the floor of the melting plant, which track 42 leads from the furnace 10 to a suitable cooling area, preferably adjacent a loading area where solidified materials can be transferred to a truck. A motor 44 secured to the back of the frame 14 drives the wheel assembly 38, and can be selectively activated to roll the cooling car 12 to either the furnace 10 or the cooling area. Alternatively, the car 12 can be coupled to any suitable towing device.

In use, the bottom of the container 16 is covered with a granular refractory material. When super-heated materials must be removed from the furnace 10, the car is advanced along the track 42 until the spout 46 of the furnace 10 is located at the guide chute 20. The furnace 10 is then tipped to empty the super-heated materials into the container 16. The car 12 is then moved along the track 42 to the cooling area, and once the contained materials have solidified, they are removed. A certain amount of the contained granular refractory will be lost and can be periodically replenished, as necessary.

It will be appreciated that a particular embodiment of the invention has been described and that modifications of a workshop nature can be made without departing from the spirit of the invention, and the scope of the appended claims.

We claim:

1. A cooling car for use in removing super-heated molten materials from a melting furnace, comprising:
   a metal frame including a container with an open top for receiving the molten materials said container having a surface area of at least 10 times its average depth;
   a relatively permanent refractory lining protecting the interior surface of the container;
   heat deflector means secured to the metal frame and extending generally upwardly about the top of the container for permitting substantial radiation of heat upwardly from molten materials received in the container while restricting radiation of heat adjacent to the side of said cooling car; and
   wheels secured to the metal frame to permit the metal frame to be rolled.

2. A cooling car as claimed in claim 1 in which the container has a chute lined with a portion of the permanent refractory lining for guiding molten materials into the container.

3. A cooling car as claimed in claim 1 in which:
   the container has a generally rectangular shape with a pair of generally parallel, spaced-apart sidewalls; and;
   the heat deflector means comprise a pair of elongate heat deflecting structures, one heat deflecting structure extending along each side wall of the container, each heat deflecting structure pivotally secured to the side wall to permit the heat deflecting structure to be pivoted between a position in which the heat deflecting structure extends upwardly over the open top of the container to deflect heat and a retracted position in which the open top of the container is open to the atmosphere,
   said heat deflectors when in said deflecting position being spaced apart horizontally to permit substantial upward flow of heat but deflecting heat from radiating substantially to either side of the car.

4. A cooling car as claimed in claim 1, 2 or 3 comprising a granular refractory lining located over the relatively permanent refractory lining.

5. A cooling car as claimed in claim 1, 2 or 3 comprising motor means attached to the metal frame for rolling the metal frame.

6. In combination with a melting furnace which produces super-heated molten materials, a system for use in removing the molten materials comprising:
   a substantially horizontal track extending from adjacent the furnace away from the furnace; and a cooling car having the structure of claim 1, said wheels adapted to permit said cooling car to roll along said track.

7. The combination of claim 6 in which the container has a chute lined with a portion of the permanent refractory lining for guiding molten materials into the container.

8. The combination of claim 6 in which:

the container has a generally rectangular shape with a pair of generally parallel, spaced-apart side walls; and, the heat deflector means comprise a pair of elongate heat deflecting structures, one heat deflecting structure extending along either side wall of the container, each heat deflecting structure pivotally secured to the side wall to permit the heat deflecting structure to be pivoted between a position in which the heat deflecting structure extends upwardly over the open top of the container to deflect heat and a retracted position in which the open top of the container is unobstructed by the heat deflecting structure.

9. The combination of claim 6, 7 or 8 comprising a granular refractory lining located over the relatively permanent refractory lining.

10. The combination of claim 6, 7 or 8 comprising motor means attached to the metal frame for rolling the cooling car.

* * * * *